April 5, 1966 B. R. MEAD 3,244,471
FILM CARTRIDGE

Filed Dec. 3, 1962 2 Sheets-Sheet 1

BRUCE R. MEAD
INVENTOR

Lyon r Lyon
ATTORNEYS

April 5, 1966  B. R. MEAD  3,244,471
FILM CARTRIDGE
Filed Dec. 3, 1962  2 Sheets-Sheet 2
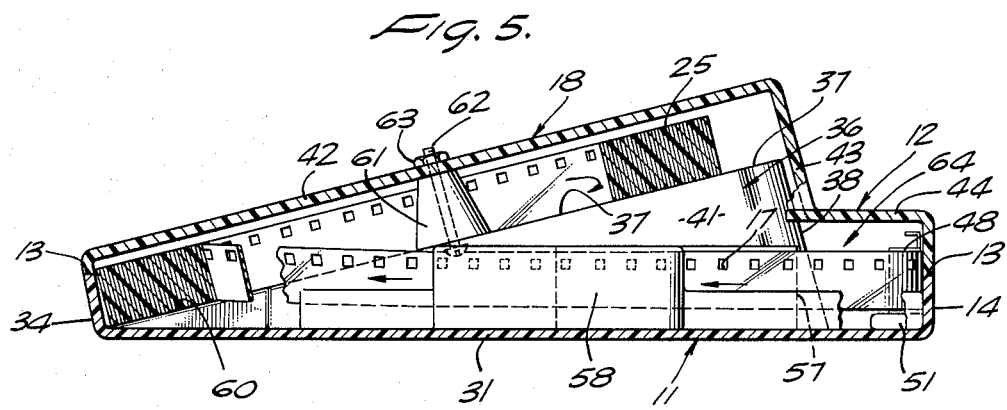
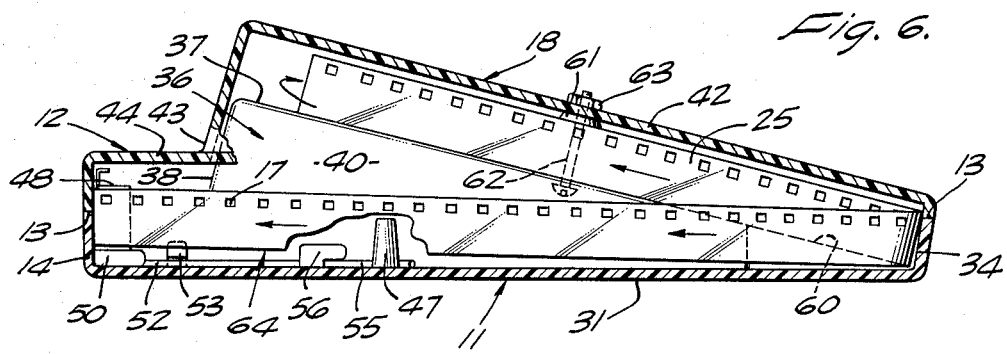
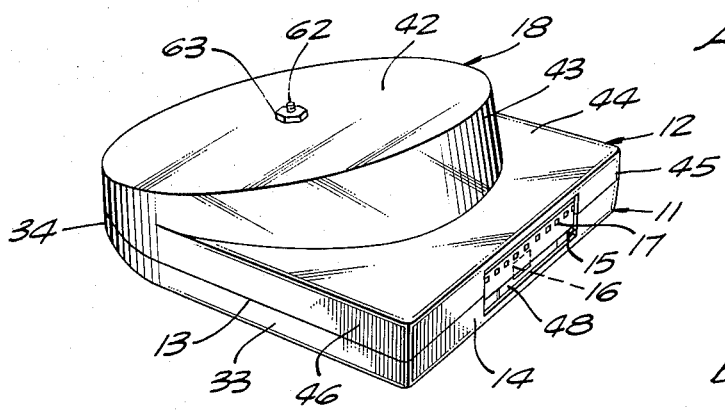
BRUCE R. MEAD
INVENTOR
BY
ATTORNEYS

3,244,471
FILM CARTRIDGE

Bruce R. Mead, Westport, Conn., assignor to Technicolor Corporation, Hollywood, Calif., a corporation of Maine
Filed Dec. 3, 1962, Ser. No. 241,790
12 Claims. (Cl. 352—72)

This invention relates to film handling devices for use in motion picture projectors and, more particularly, to a cartridge for an endless roll of film, which cartridge simultaneously serves as a container for the roll and as a means for presenting an active portion of the roll for projection or exposure.

Motion picture equipment for making and showing home movies, that is, equipment for use by relatively unskilled operators is in very widespread use at the present time. Nevertheless, many persons who would like to make their own movies and show them at home are deterred by the seeming complexity of the available cameras and projection equipment. Quite recently, a projector which is extremely simple to operate has become available on the commercial market. Only two of its many outstanding features are that its operation does not require that the film be threaded through driving sprockets, film gates and around let-off and take-up reels as in conventional projectors, and that the need for rewinding the film from a take-up reel to a let-off reel after each showing has been eliminated. Both of these simplifying features stem directly from the concept of forming a strip of otherwise conventional motion picture film having a beginning and end into an endless roll which is contained within a cartridge especially designated for the new type projector. The cartridge is arranged to guide film out of the roll and into a relatively short external loop along a path which, when the cartridge is inserted in the projector, presents a part of the film in the external loop to the film driving mechanism and the optical projection system of the projector. The external loop is then guided back into the roll. Thus, without any threading, winding or rewinding any film, the operator of the projector may show the same film over and over again without interruption and may quickly and easily change from one film to another merely by withdrawing one film cartridge from the projector and inserting another in its place. The entire operation can easily be performed even by very small children.

This bare concept of a motion picture projector using an endless film so that the same sequence of scenes may be shown over and over again is not new. Until recently, however, the implementation of the concept involved the use of elaborate and expensive film guiding means including spindles, axles and sprockets in numbers which were wholly impractical in equipment intended primarily for use in the relatively low-cost home movie market. Some recent attempts to simplify such mechanisms and embody them in a small inexpensive cartridge have encountered serious difficulties which were virtually insurmountable. For example, the operation of unwinding film from one part of a roll while simultaneously rewinding film on another part of the roll frequently resulted in binding of the film in the roll. Many attempts to remedy the difficulty by elaborating on and refining the cartridge mechanism with more precise film guiding means and more accurately formed spools and other parts failed to cure the problem.

I have invented a film cartridge for an endless roll of film which completely eliminates the binding problem and greatly reduces the wear on the film due to the motion necessary to unwind the film from the roll and then rewind it. Both of these results are achieved while eliminating all moving parts in the cartridge, some of which were previously regarded as essential. All this was accomplished only after I had observed and understood the significance of the kinetics of film transport in a projector and the possible effects thereof on a roll of film. In particular, I observed that unwinding a given length of film from a roll at one radius and rewinding the same length of film back into the roll at another radius would almost inevitably result in the multiple turns of film in the roll becoming more tightly wound upon each other if the roll were confined by a spool. It also became apparent to me that the film transport mechanism exerts intermittent accelerations of substantial magnitude which could be applied in a way to reduce binding. Experience has demonstrated that these were, indeed, keys to the solution.

In cartridges available prior to my invention there were rather narrow limits as to how much footage of film could be used in the cartridge and still obtain optimum operating characteristics. Further, only a small length of film could ever be spliced into or taken out of the roll without requiring taking the cartridge apart and changing the number of convolutions on the roll. Since these previous cartridges used a supporting spool for the film roll and pulled the film from the inner convolution and returned it to the outer convolution the roll needed to be wrapped relatively tight so that the film returning to the roll was actually pulled onto outside of the roll by the rotation caused by pulling the film off of the spool. It has been found that this tightness of the roll can cause binding of the film and malfunctions. This is particularly true since film shrinks as it becomes warm and dries out, as is well known to those skilled in the art, and therefore the film roll becomes tighter.

According to my invention, I provide a cartridge for an unspooled roll of film in which film is evolved or unrolled from the outside of the roll and led along an external loop into a position where it may be engaged by the film transport mechanism of a suitable projector and also projected by the optical system of the machine. For simplicity, I will designate this position outside the roll as the film projection plane. The film, after traversing the film projection plane is then injected back into the inside of the roll. For convenient reference the film projection plane is defined substantially by a front wall of the cartridge. A frame extends rearwardly from the front wall and has means thereon for supporting an unspooled roll of film in a position such that a radial plane of the film roll forms an acute dihedral angle with a plane normal to the film projection plane and passing through the projection aperture. I also provide first film guide means constructed and arranged on said frame to lead film evolving from the outside of an unspooled roll on said supporting means and to deliver evolved film into substantially coplanar relation with the film projection plane. Second film guide means are also provided which are constructed and arranged to receive film from the substantially coplanar relation to the projection plane and to inject the received film into the inside of the unspooled roll of film.

The unspooled roll of film is loosely confined by the supporting means. At any practical rate of transport of the film through the projection system of home movie equipment the film roll is not subjected to sustained high velocities or accelerations. Rather, it is subjected to a series of moderately high accelerations, each of which is of rather short duration. These accelerations can be reflected along the film and, if the film roll is loosely supported, can cause an almost continuous jiggling of the roll. I have found that this is precisely what is required, in combination with the film's natural tendency to straighten out or at least enlarge its radius of curvature, thereby tending to keep the adjacent turns of the roll separated from each other enough so that there are no significant frictional forces which tend to cause the turns of the roll of film to become more tightly wound.

There are other significant advantages attributable to my invention. It is, of course, inevitable that as a given length of film progresses from the innermost turn to the outermost turn of the roll that there will be some sliding between portions of the film which are at a given time in adjacent turns of the roll. If this were to occur to any great extent in a roll which was wound with the usual tension, the film would almost certainly become badly scratched. However, the very looseness of the turns in the roll of film as it is held in my new cartridge minimizes this source of wear to the extent that it is not significant. In addition, the film is customarily waxed by the processing laboratory prior to release in order to minimize friction in the projection aperture. If the film has not been waxed or coated with some type of lubricant by the laboratory, I prefer to apply a transparent coating of lubricant before the film is loaded into the cartridge.

In contrast to several other cartridges designed for this same end use, the dimensions and other characteristics of my new cartridge are relatively non-critical. There are preferred positions for taking the film off the roll and injecting it into the roll which result in optimum performance of the cartridge and which have ancillary advantages. These and other features will be explained in detail in the following description of a particular embodiment of the invention. In the course of the description reference will be made to the accompanying drawing in which:

FIGURE 5 is a view in section taken substantially along the line 5—5 in FIGURE 4 with portions broken away for clarity.

FIGURE 6 is a view in section taken substantially along the line 6—6 in FIGURE 4 with portions broken away for clarity.

FIGURE 7 is a perspective view of the film cartridge shown in FIGURES 2, 4, 5 and 6.

Figure 1:
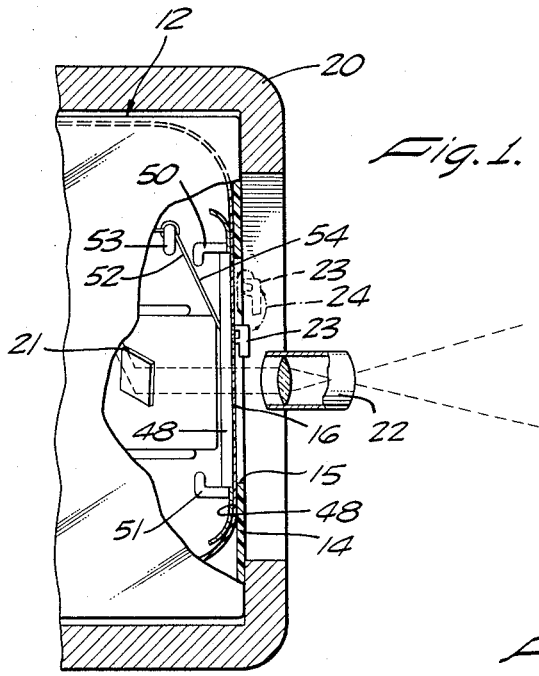
FIGURE 1 is a cross-sectional view, partly broken away, showing the relation between a cartridge according to my invention and a motion picture projector.
Figure 2:
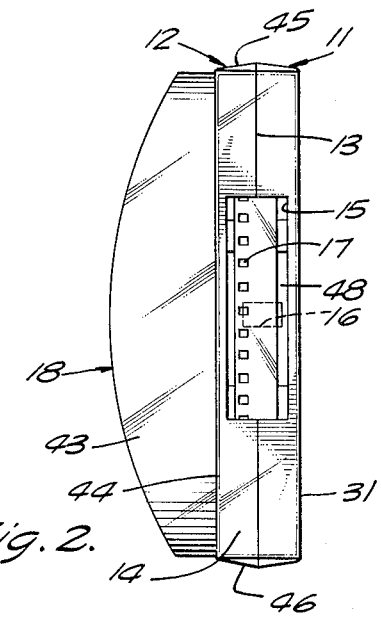
FIGURE 2 is a front elevation of a cartridge according to my invention.

In the figures and particularly FIGURES 2 and 7 the external appearance of my new film cartridge is illustrated. For purposes of orientation, this particular embodiment is simply formed of two hollow molded-plastic parts identified generally as 11 and 12. The two parts are separably joined along mating edges indicated at 13. Together these parts form a closed cartridge having a front wall 14 with an aperture 15 therethrough. For the purposes of this description and for reasons which will presently appear this front wall will be said to define a film projection plane. The frame of the film being projected at any given time passes immediately behind this front wall so that it can be said to be in substantially coplanar relation with the film projection plane defined by the wall. The projection aperture is seen in FIGURES 1, 2 and 7 at 16. Conventional marginal perforations by which the film is engaged by a film transport mechanism are illustrated at 17. A roll of film is contained within a substantially cylindrical compartment, generally designated 18, formed by the parts 11 and 12, and the loop of film connecting the outer convolution to the inner convolution of the roll to form an endless film roll is contained in the chamber or passageway, generally designated 64, formed by parts 11 and 12.

To assist the reader to fully understand the invention, I have shown in FIGURE 1 a simplified cross-sectional view of a projector with which my new cartridge may be used. A projector of this type is presently available through commercial channels. In FIGURE 1 the outer casing of the projector itself is shown at 20. There is an opening in the rear of the casing through which film cartridges may be inserted and extracted. The operative position of the cartridge in the camera is the vertical position shown in FIGURE 2. A light reflecting mirror 21 is movably mounted within the projector so that it may swing into and out of a recess in the cartridge which is positioned behind a suitable optical projection system 22. A high intensity light (not shown) is also mounted within the casing of the projector and, when the mirror 21 is in the operative position shown in FIGURE 1, light from the source is reflected by the mirror 21 through the optical system 22. The purpose of making the mirror 21 movable is simply that it must be able to swing out of the way while the film cartridge is being inserted into or extracted from the projector.

In FIGURE 1 the part 12 of the cartridge is shown partly broken away and front wall 14 is shown partly in section so that the general relation between the cartridge and the components of the projector itself may be illustrated. When the projector is operating, a film driving claw 23 moves through a more or less elliptical path shown by the dotted line 24 and in the direction indicated by the arrows on the line. This claw engages the marginal perforations 17 in the film and, by means of a mechanism which it is not necessary to illustrate here, pulls the film downwardly through a distance equivalent to the length of one frame. As indicated by the dotted line, the claw then disengages from the film perforations and moves upwardly to the position where it again engages the perforations in the film. Thus, the film is subjected to a series of intermittent motions as it moves along the film projection plane and into the path of the light reflected by mirror 21 through the optical system 22.

Figure 3:
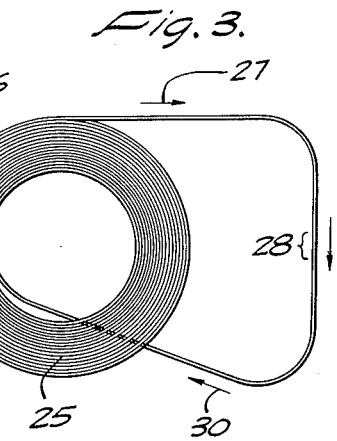
FIGURE 3 is a schematic illustration of an endless film roll as used in the cartridge according to the invention.

In FIGURE 3 I have illustrated schematically the configuration of an unspooled endless roll of film 25 and I have shown the path of an external loop of film. According to my invention the roll of film is rotated clockwise as indicated by the arrow 26 by film being pulled off of the outside of the roll and led in the direction indicated by the arrow 27. The film frame being projected is indicated approximately by the bracket 28. As previously stated, the projection aperture is in substantially coplanar relation with the film projection plane defined by the front wall 14 of the cartridge. The length of film in this external loop leaves the film projection plane and follows a path indicated by the arrow 30. The loop passes behind the roll as seen in FIGURE 3 and is then injected back into the inside of the roll.

Turning now to the details of construction of the particular embodiment of the cartridge used here to illustrate the invention, it is seen that the two parts 11 and 12 of the cartridge cooperate to form a single film containing structure. This structure is, in essence, a frame provided with supporting means for an unspooled film roll, film guiding means and means for positioning a portion of the external loop in the film projection plane where the film is engaged by a transport mechanism and also intersects the optical path of the projection system.

Figure 4:
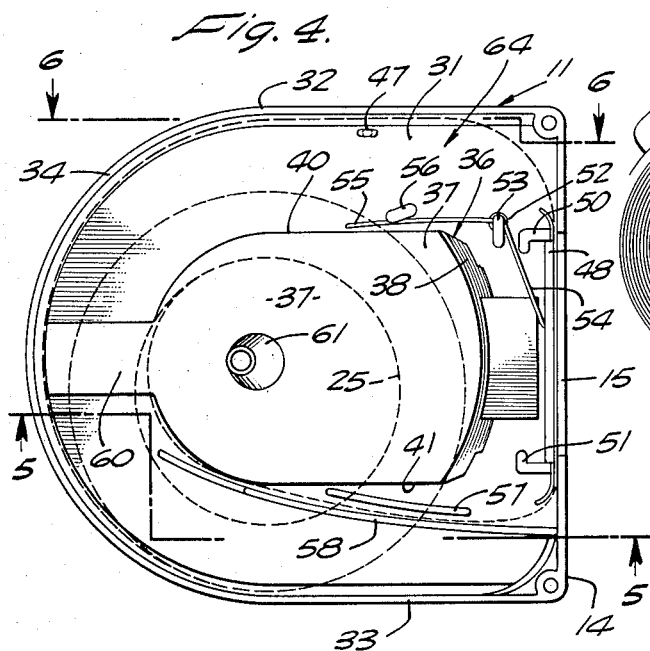
FIGURE 4 is a side elevation of the cartridge with one half removed for showing the internal arrangement of the film and cartridge according to the invention.

The film roll supporting means is, in this particular embodiment, a cylindrical compartment 18 positioned rearwardly of the front wall 14, that is, to the left in FIGURES 4 and 5 and to the right in FIGURE 6. According to my invention the film roll is unspooled and, therefore, must be supported by means which will sustain the film in its rolled up form as well as hold the roll in the proper position so that film may be evolved from the roll and injected back into it with a minimum of flexing. According to the invention the film roll is positioned so that a radial plane through the roll forms an acute dihedral angle with a plane normal to the projection plane. This relation may be quite easily visualized by referring to FIGURES 5 and 6.

The part 11 has a side wall 31 and this side wall has peripheral walls around its edges. One of these peripheral walls lies in a plane normal to side wall 13 and constitutes a part of the front wall 14 of the cartridge. The remainder of the peripheral walls is made up of the straight portions 32 and 33 along the top and bottom edges of the side wall 31 as seen in FIGURE 4 and the curved portion 34 around the left edge. It will be seen in FIGURES 5 and 6 that a radial plane through the film roll indicated at 25 will intersect the plane of the wall 31 rearwardly of the front wall 14 at an acute angle. The fim compartment for supporting the roll is formed by an inclined pedestal 36 molded as an integral part of the cartridge part 11. This pedestal has a film supporting surface 37 which is supported along its front edge by a wall 38 and is supported along its side edges by walls 40 and 41. Walls 38, 40 and 41 being integrally joined to wall 31. A surface 60 extends from surface 37 to the base of peripheral wall 34 to complete the supporting surface for that side of the film roll.

The film roll is supported on one side by the surfaces 37 and 60 and is supported on the other side by the wall 42 of the part 12. This latter wall is parallel to the inclined surface of the pedestal 36 and is spaced from it by slightly more than the width of the film. The film compartment is closed by the truncated cylindrical wall 43 which is molded integrally with the wall 42 of the part 12 and by a portion of the wall 34 of part 11. In this embodiment, the part 12 also has a plane wall 44 extending forwardly from the foot of the forward part of the cylindrical wall 43 as best shown in FIGURE 7. This wall 44 may also be regarded as a frame member for the cartridge. It has along its forward edge a peripheral wall which constitutes part of the front wall 14 of the cartridge and it has along its top and bottom edges peripheral walls 45 and 46 as indicated in FIGURES 2 and 7. These peripheral walls of the part 12 mate with the corresponding peripheral walls of the part 11 to form a completely closed cartridge. As is evident from the figures, the film roll is laterally confined by the wall 42 of the part 12 on one side and by the surface 37 of the pedestal 36 on the part 11 on the other side. When the cartridge is in the upright and operative position as shown in FIGURES 1 through 4, the film roll rests on the lowermost portion of the cylindrical wall 43 of the part 12 and a portion of wall 34 of part 11.

In accordance with the invention, I provide means for guiding film being evolved from the roll into the film projection plane of the cartridge. In this embodiment these means consist very simply of the peripheral wall 32 of the part 11 and the guide post 47 which is spaced a short distance inwardly from the wall 32 and is formed integrally with the wall 31 of the part 11. As shown in FIGURE 4, the film evolved from the roll passes between the wall 32 and the post 47. A guide post similar to post 47, but not shown in the drawings, may extend from wall 44 of part 12 toward post 47.

At 48 I have illustrated an aperture plate. The film passes between the interior surface of the front wall 14 and the aperture plate which serves to guide the film along the film projection plane as previously defined. The aperture plate is confined to its proper longitudinal position behind the front wall of the cartridge by the stop members 50 and 51 which extend rearwardly from the front wall 14 and inwardly from the wall 31 of the part 11. Similar stop members may also be provided on the inside of wall 44. The aperture plate 48 is also urged toward the front wall 14 by a torsion spring 52. The fulcrum of this spring is at the post 53 which is molded integrally with and extends inwardly from the wall 31.

The spring has an elongated arm 54 which bears against the aperture plate 48 and another elongated arm 55 which bears against the stop post 56, also molded integrally with the wall 31 and extending inwardly therefrom. This spring is held in compression by the stop post 56 and the aperture plate so that it constantly urges the aperture plate toward the front wall.

The active portion of the film being driven through the film projection plane emerges from between the aperture plate and the front wall at the lower end of the aperture plate 48. From there the film is directed rearwardly of the cartridge and injected back into the interior of the film roll. In the preferred embodiment the film is directed along this portion of its course through a channel formed by the elongated walls 57 and 58 which are molded integrally with and extend inwardly from the wall 31 of the part 11. They are spaced from each other by any convenient distance sufficient to confine the film laterally, yet permit the film to move freely along the channel. The configuration of the walls is best seen in FIGURE 4. As shown there, the walls curve upwardly so that the film is guided along a curve of relatively large radius into the interior of the film roll. Walls similar to walls 57 and 58 may be provided on walls 42 and 44 of the part 12 and extend inwardly toward walls 57 and 58 to assist in guiding the film. As previously explained the film being directed back into the interior of the film roll passes behind the roll as seen in FIGURE 4 or underneath it as seen in FIGURE 5. Positive insertion of the film into the roll is assured by the narrow extension surface 60 of the supporting surface 37, for the lower edge of the film, as shown in FIGURE 5, must pass over the upper edge of the narrow extension surface 60 of the pedestal.

The two parts 11 and 12 of the cartridge are held together in proper relation by the hollow spacer post 61 which is molded integrally with the part 11 and extends inwardly from the wall 37 of the pedestal. The height of this spacer post is substantially the same as the desired spacing between the opposed film supporting surfaces provided by the walls 37 and 42. A bolt 62 or other suitable fastener passes through the post 61 and the wall 42 and is engaged by a nut 63. A separable fastener of this type makes it possible to open the cartridge to change the film or edit it as may be necessary from time to time.

As previously stated, the footage of film in the roll is not critical so long as the roll is freely movable within the film compartment; for example, a cartridge designed for 50 feet of film can function perfectly well with as much as 65 feet of film or as little as 25 feet of film in the roll. Moreover, in contrast to previous cartridges where the film was tightly wrapped on the spool as heretofore described, the length of film in the cartridge of this invention may be varied over a relatively wide range by splicing-in additional footage or deleting footage, as desired, by merely pulling the film out through aperture 15 in the front wall and performing the desired step. The size of the film roll will be changed but the operation will be unaffected which was not true of previously available cartridges. Further, the change in length of the film due to heating and drying-out will not affect the operation of my cartidge but will merely change the size of the roll slightly.

In this preferred embodiment, it is desirable to evolve the film from the upper left-hand quadrant of the roll as seen in FIGURE 4. In this way, the film roll tends to be lifted off the bottom of the film compartment as the film is transported through the film projection plane. This tends to reduce the driving force required to turn the roll and also reduces the frictional contact between the roll and the bottom of the film compartment, thereby minimizing scratching of the film.

I also prefer to inject the film back into the roll at or near the junction between the upper lefthand and the lower left-hand quadrants of the film roll as seen in FIGURE 4. The film has some inherent stiffness and when it is injected at this point the forces acting on the roll add to the forces due to the film being evolved from the outside of the roll. This additional force assists in turning the roll.

The foregoing description of a preferred embodiment of my invention is given solely for illustrative purposes. The invention is not to be limited to the details of this preferred embodiment; rather, the invention is defined in the following claims.

I claim:

1. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel surfaces spaced apart a slightly greater distance than the width of the film for loosely confining the film in a roll, said passageway having a projection aperture for the film to pass through and be projected; the film being evolved from the outer convolution of the film roll, passing through the passageway past the projection aperture, and then being injected into the film roll as the inner convolution; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and means in said frame extending from a location in said passageway outside said film roll to a location inside the film roll for forming a confining guide and physically directing the film from said projection aperture to the inside of the film roll.

2. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel surfaces spaced apart a slightly greater distance than the width of the film for loosely confining the film in a roll, said compartment having means for supporting the film roll in all directions perpendicular to the axis of the film roll, said passageway having a projection aperture for the film to pass through and be projected; the film being evolved from the outer convolution of the film roll, passing through the passageway past the projection aperture, and then being injected into the film roll as the inner convolution; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and means in said frame extending from a location in said passageway outside said film roll to a location inside the film roll for forming a confining guide and physically directing the film from said projection aperture to the inside of the film roll.

3. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel surfaces spaced apart a slightly greater distance than the width of the film for loosely confining the film in a roll having an axis substantially perpendicular to said surfaces, said compartment having means for supporting the film roll in all directions perpendicular to the axis of the film roll, an aperture plate mounted in said passageway and having a projection aperture for the film to pass through for projecting; the film being evolved from the outer convolution of the film roll, passing through the passageway including passing coplanar over the aperture plate and by the projection aperture, and then being injected into the film roll as the inner convolution; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and means in said passageway forming a guide for leading the film from the outer convolution of the film roll to said projection aperture and means in said frame extending from a location in said passageway outside said film roll to a location inside the film roll for forming a confining guide and physically directing the film from said projection aperture to the inner convolution of the film roll.

4. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel surfaces spaced apart a slightly greater distance than the width of the film for loosely confining the film in a roll, said compartment having a relatively cylindrical wall encircling the film roll for radially supporting the roll in all directions, said passageway having a projection aperture for the film to pass through for projecting; the film being evolved from the outer convolution of the film roll, passing through the passageway past the projection aperture, and then being injected into the roll as the inner convolution; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and means in said passageway forming a guide for leading the film from the outer convolution of the film roll to said projection aperture and means in said frame extending from a location in said passageway outside said film roll to a location inside the film roll for forming a confining guide and physically directing the film from said projection aperture to the inner convolution of the film roll.

5. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel surfaces spaced apart a slightly greater distance than the width of the film for loosely confining the film in a roll having a substantially horizontal axis when the cartridge is positioned in the projector or camera for use, said compartment having a relatively cylindrical wall encircling and supporting said film roll, said passageway having a projection aperture for the film to pass through and be projected; the film being evolved from the outer convolution of the roll at the upper quadrant of the roll remote from the said projection aperture, passing through the passageway past the projection aperture, and then being injected into the film roll as the inner convolution at or near the juncture of the upper and lower quadrants of the roll remote from the projection aperture; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and means in said passageway forming a guide for leading the film from the outer convolution of the film roll to said projection aperture, and means in said frame extending from a location in said passageway outside said film roll to a location inside the film roll for forming a confining guide and physically directing the film from said projection aperture to the inner convolution of the film roll.

6. A cartridge for an unspooled roll of film in which film is moved from the outside of the roll and led to a film projection plane and then returned to the inside of the roll of film, which cartridge comprises a frame provided with a front wall defining a film projection plane, an aperture plate which confines the film to the film projection plane for the purpose of projection, an offset compartment within said frame to provide support for the roll of film and to allow light to be introduced into said projection aperture, a guide channel within said frame having wall means extending from a location outside the film roll across the film roll to a location inside the film roll for physically directing film from the film projection plane into the inside coil of said roll of film, said film roll rotating during continuing projection, and the film removed from the outside of the roll and directed to the inside coil by a force applied to the film remote from the roll and comprising the sole force causing said rotation of the film roll.

7. A cartridge for an unspooled roll of film in which film is moved from the outside of the roll and led to a film projection plane and then returned to the inside of the roll of film, which cartridge comprises a frame provided with a front wall defining a film projection plane, an aperture plate which confines the film to the film projection plane for the purpose of projection, a compartment in said frame having substantially parallel and spaced surfaces for loosely confining the film in a roll and having a relatively cylindrical wall encircling and supporting the film roll, said compartment being offset from the film projection plane to allow light to be introduced into said projection aperture, a guide channel within said frame having wall means extending from a location outside the film roll across the film roll to a location inside the film roll for physically directing film from the film projection plane into the inside coil of said roll of film, said film roll rotating during continuing projection, and the film removed from the outside of the roll and directed to the inside coil by a force applied to the film remote from the roll and comprising the sole force causing said rotation of the film roll.

8. A cartridge for an unspooled roll of film in which film is moved from the outside of the roll and led to a film projection plane and then returned to the inside of the roll of film, which cartridge comprises a frame provided with a front wall defining a film projection plane, an aperture plate which confines the film to the film projection plane for the purpose of projection, a compartment in said frame having substantially parallel and spaced surfaces for loosely confining the film in a roll and having a relatively cylindrical wall encircling and supporting the film roll, said compartment being offset from the film projection plane to allow light to be introduced into said projection aperture, guide means for leading the film from the outside of the roll to the film projection plane, second guide means within said frame extending from a location outside the film roll across the film roll to a location inside of the film roll for physically directing the film from the film projection plane into the inside coil of the film roll, said film roll rotating during continuing projection, and the film removed from the outside of the roll and directed to the inside coil by a force applied to the film remote from the roll and comprising the sole force causing said rotation of the film roll.

9. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel fixed surfaces spaced apart a slightly greater distance than the width of the film for loosely confining the film laterally in a roll and fixed surrounding surfaces at least partially encircling said film roll, said fixed compartment surfaces comprising the sole means of support for said film roll, said passageway having a projection aperture for the film to pass through and be projected; the film being evolved from the outer convolution of the film roll, passing through the passageway past the projection aperture, and then being injected into the film roll as the inner convolution; and fixed means in said frame extending from a location within said passageway outside said film roll to a location inside the film roll for forming a confining guide and physically directing the film from said projection aperture to the inside of the film roll.

10. A cartridge for an endless and unspooled roll of film adapted for use in a projector or camera having means for engaging and advancing the film: comprising a frame having a compartment for containing the film roll and a passageway for receiving the loop portion of film connecting the inner convolution of the film roll to the outer convolution, said compartment having substantially parallel fixed surfaces spaced apart a slightly greater distance than the width of the film for loosely confining the film laterally in a roll and fixed surrounding surfaces at least partially encircling said film roll, said fixed compartment surfaces comprising the sole means of support for said film roll, said passageway having a projection aperture for the film to pass through and be projected; the film being evolved from the outer convolution of the film roll, passing through the passageway past the projection aperture, and then being injected into the film roll as the inner convolution; said evolving and injecting of the film from and into the film roll caused by remotely applied force on said film loop portion by the said means for engaging and advancing the film, and said force on the film loop portion comprising the sole means for rotating said film roll for permitting the film to be continuously evolved and injected; and fixed means in said frame extending from a location within said passageway outside said film roll to a location inside the film roll for forming a confining guide and physically directing the film from said projection aperture to the inside of the film roll.

11. A cartridge for an endless and unspooled roll of film in which film is moved from the outside of the roll and led to a film projection plane and then returned to the inside of the roll of film, which cartridge comprises a frame provided with a front wall defining a film projection plane, an aperture plate which confines the film to the film projection plane for the purpose of projection, an offset compartment within said frame having fixed surfaces for providing the sole support for the roll of film and offset to allow light to be introduced into said projection aperture, and a fixed guide within said frame having means extending from a location outside the film roll to a location inside the film roll for physically directing film from the film projection plane into the inside coil of said roll of film.

12. A cartridge for an endless and unspooled roll of film in which film is moved from the outside of the roll and led to a film projection plane and then returned to the inside of the roll of film, which cartridge comprises a frame provided with a front wall defining a film projection plane, an aperture plate which confines the film to the film projection plane for the purpose of projection, an offset comparement within said frame having fixed surfaces for providing the sole support for the roll of film and offset to allow light to be introduced into said projection aperture, a fixed guide within said frame having means extending from a location outside the film roll to a location inside the film roll for physically directing film from the film projecting plane into the inside coil of said roll of film, said film roll rotating during continuing projection, and the film removed from the outside of the roll and directed to the inside coil by a force supplied to the film remote from the roll and comprising the sole force causing said rotation of the film roll.

References Cited by the Examiner

UNITED STATES PATENTS

| | | | |
|---|---|---|---|
| 1,897,283 | 2/1933 | Templeton | 352—128 |
| 1,935,572 | 11/1933 | Leventhal | 352—83 |
| 2,238,719 | 4/1941 | De Tartas. | |
| 2,338,421 | 1/1944 | Fries | 242—55.21 X |
| 2,464,965 | 3/1949 | Chemel | 242—55.19 |
| 3,139,789 | 7/1964 | Schrader | 242—55.11 X |

FOREIGN PATENTS 457,261  11/1936  Great Britain.

NORTON ANSHER, *Primary Examiner.*

WILLIAM MISIEK, *Examiner.*

ROBERT D. MUHL, VANCE A. SMITH,
*Assistant Examiners.*